United States Patent
Watzenberger et al.

(10) Patent No.: US 6,758,946 B2
(45) Date of Patent: Jul. 6, 2004

(54) RECYCLING HYDROXYLAMINE-CONTAINING STRIPPER SOLUTIONS

(75) Inventors: Otto Watzenberger, Mannheim (DE); Heiner Schelling, Kirchheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/771,651

(22) Filed: Jan. 30, 2001

(65) Prior Publication Data

US 2001/0011633 A1 Aug. 9, 2001

(30) Foreign Application Priority Data

Feb. 4, 2000 (DE) .......................................... 100 04 818

(51) Int. Cl.⁷ ............................ B01D 3/38; C01B 21/14
(52) U.S. Cl. ............................ 203/78; 203/79; 203/93; 203/94; 203/97; 203/98; 423/387

(58) Field of Search ..................... 203/78–79, 92–98, 203/14, 80, 90; 423/387; 564/301

(56) References Cited

U.S. PATENT DOCUMENTS

| | | | |
|---|---|---|---|
| 5,837,107 A | * 11/1998 | Watzenberger et al. | ....... 203/78 |
| 6,235,162 B1 | * 5/2001 | Sharifian et al. | .............. 203/74 |
| 6,299,734 B1 | * 10/2001 | Watzenberger et al. | ....... 203/14 |

* cited by examiner

Primary Examiner—Virginia Manoharan
(74) Attorney, Agent, or Firm—Keil & Weinkauf

(57) ABSTRACT

A process for working up hydroxylamine-containing solutions as obtained in particular in the electronics industry during the cleaning of electronic components is described. According to the invention, the hydroxylamine is stripped from the wastewater with steam. The products obtained are aqueous hydroxylamine and an aqueous solution of the amines. Both product streams can be purified in further process steps to give a saleable product.

18 Claims, 1 Drawing Sheet

RECYCLING HYDROXYLAMINE-CONTAINING STRIPPER SOLUTIONS

The present invention relates to a process for working up hydroxylamine-containing solutions, in particular from the electronics industry.

In the electronics industry, aqueous solutions of hydroxylamine and amines are used for cleaning electronic components, such as chips. These mixtures contain from about 10 to 30% of water, from 5 to 20% of hydroxylamine and from 50 to 85% of amines. An amine used is, for example, N-methylpyrrolidone. The spent solutions are only slightly contaminated. To date, it has not been possible to recycle them and they have had to be disposed of. The amines contained in the spent solutions are bacteriotoxic. Introduction into a wastewater treatment plant and biological working-up are therefore not possible. The spent solutions can be disposed of only in drums. The hydroxylamine contained in the solutions and the amines used are hazardous to health. Since these compounds are also corrosive, the storage areas must be permanently monitored in order to discover any leaks in good time.

Chemical decomposition of the hydroxylamine and subsequent working-up of the amines in an aqueous medium are possible. However, appropriate (chemicals must be used for this purpose and give rise to costs. Moreover, the decomposition reaction is slow since the hydroxylamine is stabilized by the amines. It is therefore necessary to accept long residence times and it is for this reason that the plants must have relatively large dimensions.

Working up the solutions by distillation is not possible. Hydroxylamine is a thermally labile compound which can decompose in an explosive manner. In the solutions, it is stabilized by amines or is present in dilute form. During distillation, water is taken off via the top and the amines remain in the bottom. Being a medium boiler, the hydroxylamine accumulates locally in certain regions of the column and concentrations are reached at which the hydroxylamine tends to decomposition, which can take place spontaneously and explosively under certain circumstances.

It is an object of the present invention to provide a process for working up hydroxylamine-containing solutions, in particular from the electronics industry, which permits easier disposal of the waste or, if necessary after further purification steps, permits recycling of the individual components to the production process.

We have found that this object is achieved by the novel process for working up hydroxylamine-containing solutions, in particular from the electronics industry, wherein the hydroxylamine is stripped from the wastewater with steam.

An aqueous solution of hydroxylamine which has been substantially freed from amines and in which the hydroxylamine can be decomposed substantially more easily owing to the lack of the stabilizing effect of the amines is obtained. The remaining amine-containing aqueous solution can be worked up by distillation, it being possible to recover the amines in pure form.

Particularly for continuous working-up of the solutions, a specific embodiment of the novel process is suitable, in which the solution is passed into a rectification column and the hydroxylamine is stripped by the countercurrent method with steam, a top product comprising aqueous hydroxylamine and a bottom product being obtained.

The top product obtained is an aqueous hydroxylamine solution which has a water content of from 80 to 98% by weight. An aqueous solution of the amines having an amine content of from 40 to 70% by weight collects in the bottom. Both streams can be further processed and can be converted into saleable products by further purification. The rectification column used may be any conventional column type. Examples are packed columns, bubble tray columns or columns having internals.

In order to reduce the amine content of the aqueous hydroxylamine solutions taken off via the top, in a specific embodiment of the novel process the top product is condensed and is partly recycled to the rectification column, a reflux ratio of <0.5 being chosen.

At a reflux ratio of >0.5, the hydroxylamine is forced back into the bottom and its separation is therefore prevented. If the reflux ratio is too low, there is the danger that amines will be entrained from the initially taken mixture and the hydroxylamine obtained will be contaminated.

The rectification column is operated under atmospheric pressure to a reduced pressure of 0.1 atmosphere, preferably at from 0.8 to 1.0 atmosphere. It has also proven suitable to operate the rectification column at from 0.2 to 0.7.

The bottom product obtained is an aqueous amine fraction which has to be further worked up. The amount of bottom product can be advantageously reduced by again vaporizing at least some of the bottom product and recycling the preferably vaporous fractions to the rectification column. Consequently, the amount of water added to the bottom of the rectification column can be greatly reduced.

Furthermore, in such an embodiment of the novel process, the water need not necessarily be added in the form of steam. The water may be added, at least partly, to the liquid phase of the rectification column, preferably passed into the bottom of the rectification column.

In this way, an aqueous solution having an amine content of from about 70 to 98% by weight can be obtained as the bottom product.

The novel process is explained in more detail with reference to a drawing.

EXAMPLE 1

Figure 1:
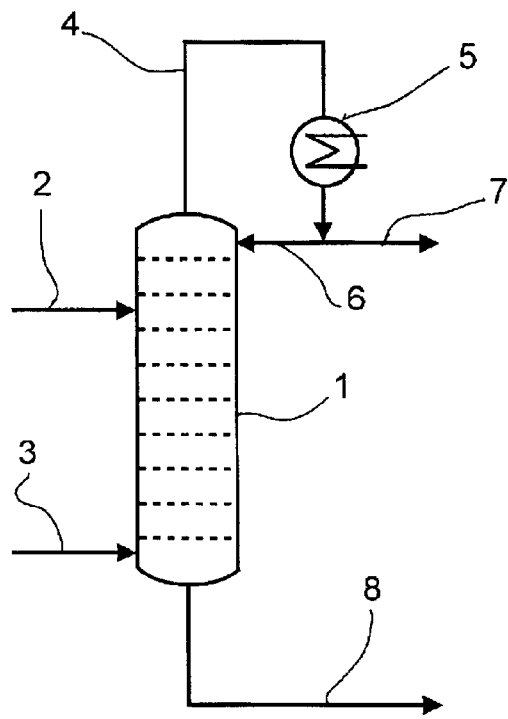
FIG. 1 shows a first embodiment of an apparatus for carrying out the novel process.

FIG. 1 shows the experimental setup for a first embodiment of the novel process. Solutions obtained as wastewater in the purification of electronic components are worked up. In a glass bubble tray column 1 having a diameter of 50 mm and 40 bubble trays, 2 kg/h of a wastewater solution are passed continuously onto the 35th tray via wastewater feed line 2. The wastewater is composed of 27% by weight of water, 17% by weight of hydroxylamine and 56% by weight of amines. 4 kg/h of steam are passed into the bottom of the column via steam feed line 3. A part of the steam is required as stripping steam. The heat liberated on condensation of the remaining part of the steam is used for supplying energy to the column. A top product is removed via discharge line 4 and is condensed in the condenser 5. A part of the condensed top product is recycled to the column via recycle line 6. A very low reflux ratio of 0.01 is chosen. An aqueous solution containing 8.6% by weight of hydroxylamine is obtained as top product and can be removed via discharge line 7. An aqueous solution of the amines collects in the bottom of the rectification column 1 and is removed via bottom discharge line 8. The bottom product obtained comprises the amines and has a water content of 45.5% by weight.

EXAMPLE 2

Figure 2:
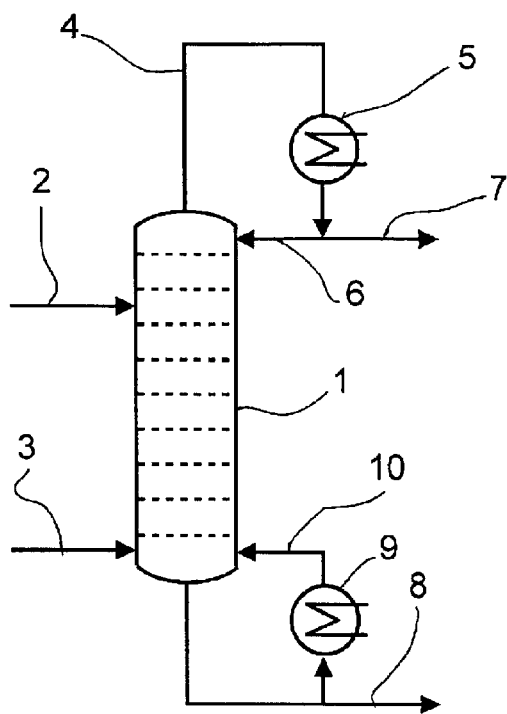
FIG. 2 shows a second embodiment of an apparatus for carrying out the novel process.

The experimental setup shown in FIG. 2 for a second embodiment of the novel process corresponds substantially to the experimental setup shown in FIG. 1. A heat exchanger 9 by means of which a part of the bottom product is vaporized again is additionally provided. The vaporous fractions are recycled to the bottom of the column 1 via recycle line 10. As in Example 1, a glass bubble tray column having a diameter of 50 mm and 40 bubble trays is used and 2 kg/h of wastewater are passed continuously onto the 35th tray of said column via feed line 2. The amount of stripping steam passed into the bottom of the column via steam feed line 3 is reduced to 3 kg/h compared with Example 1. In addition, energy is introduced via heat exchanger 9. The reflux ratio established via condenser 5 and recycle line 6 is set at 0.01, as in Example 1. An aqueous solution containing 9% by weight of hydroxylamine is removed as top product via discharge line 7. An aqueous solution of the amines is obtained via bottom discharge line 8, the water concentration in the bottom take-off being reduced to 8% by weight.

The product streams obtained in the Examples can be readily processed. The aqueous hydroxylamine solution obtained as top product can either be relatively easily decomposed or, for example, worked up by distillation to give a saleable product. The bottom product, aqueous amine, can be separated continuously or batchwise by distillation into water and amine having a water content of about 2% by weight. The wastewater obtained on working up the amine can be passed into a wastewater treatment plant and further worked up there.

We claim:

1. A process for working up a solution of hydroxylamine and amines, which comprises passing the solution into a rectification column, and stripping the hydroxylamine from the solution by the countercurrent method with steam to obtain a top product comprising aqueous hydroxylamine and a bottom product comprising amines.

2. A process as claimed in claim 1, wherein the rectification column is operated at from 0.1 to 1.0 atmosphere.

3. A process as claimed in claim 2, wherein the rectification column is operated at from 0.8 to 1.0 atmosphere.

4. A process as claimed in claim 1, wherein a fraction of the bottom product is vaporized by means of an evaporator and the vaporized fraction is recycled to the rectification column.

5. A process as claimed in claim 1, wherein water is added to the rectification column.

6. A process as claimed in claim 5, wherein the water is passed into the bottom of the rectification column.

7. A process as claimed in claim 1, wherein the solution is a solution used for cleaning electronic components.

8. A process as claimed in claim 1, wherein the solution of hydroxylasine and amines comprises a bacteriotoxic amine.

9. A process as claimed in claim 1, wherein the solution of hydroxylamine and amines comprises N-methylpyrrolidone.

10. A process for working up a solution of hydroxylamine and amines,
    wherein the hydroxylamine is stripped from the solution with steam,
    wherein the solution is passed into a rectification column and steam is passed counter-currently through the column, whereby a top product comprising aqueous hydroxylamine and a bottom product comprising amines are obtained, and
    wherein the top product is condensed and is partly recycled to the rectification column with a reflux ratio of lees than 0.5.

11. A process as claimed in claim 10, wherein the rectification column is operated at from 0.1 to 1.0 atmosphere.

12. A process as claimed in claim 11, wherein the rectification column is operated at from 0.8 to 1.0 atmosphere.

13. A process as claimed in claim 10, wherein a fraction of the bottom product is vaporized by means of an evaporator and the vaporized fraction is recycled to the rectification column.

14. A process as claimed in claim 10, wherein water is added to the rectification column.

15. A process as claimed in claim 14, wherein the water is passed into the bottom of the rectification column.

16. A process as claimed in claim 10, wherein the solution is a solution used for cleaning electronic components.

17. A process as claimed in claim 10, wherein the solution of hydroxylamine and amines comprises a bacteriotoxic amine.

18. A process as claimed in claim 10, wherein the solution of hydroxylasine and amines comprises N-methylpyrrolidone.

* * * * *